(12) United States Patent
Sweeney et al.

(10) Patent No.: US 8,893,134 B2
(45) Date of Patent: Nov. 18, 2014

(54) LOCATING BOTTLENECK THREADS IN MULTI-THREAD APPLICATIONS

(75) Inventors: Peter F. Sweeney, Hawthorne, NY (US); Qiming Teng, Beijing (CN); Haichuan Wang, Beijing (CN); Xiao Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/086,151

(22) Filed: Apr. 13, 2011

(65) Prior Publication Data

US 2012/0265968 A1    Oct. 18, 2012

(51) Int. Cl.
*G06F 9/46* (2006.01)
*G06F 9/30* (2006.01)

(52) U.S. Cl.
CPC ........................................ *G06F 9/30* (2013.01)
USPC .......................................... 718/102; 712/219

(58) Field of Classification Search
None
See application file for complete search history.

(56) References Cited

U.S. PATENT DOCUMENTS

| | | | | |
|---|---|---|---|---|
| 6,427,161 | B1 * | 7/2002 | LiVecchi | 718/102 |
| 7,137,120 | B2 * | 11/2006 | Armstrong et al. | 718/107 |
| 7,159,220 | B2 | 1/2007 | Buch | |
| 8,046,760 | B2 * | 10/2011 | Seidman et al. | 718/102 |
| 2006/0123156 | A1 * | 6/2006 | Moir et al. | 710/33 |
| 2007/0169123 | A1 * | 7/2007 | Hopkins | 718/100 |
| 2007/0220513 | A1 | 9/2007 | Hwang | |
| 2008/0120622 | A1 * | 5/2008 | Follis et al. | 718/105 |
| 2008/0288496 | A1 * | 11/2008 | Duggirala et al. | 707/8 |
| 2009/0027714 | A1 * | 1/2009 | Kuhn et al. | 358/1.15 |
| 2009/0235247 | A1 * | 9/2009 | Cho et al. | 718/1 |
| 2009/0240526 | A1 * | 9/2009 | Vesto et al. | 705/3 |
| 2011/0208928 | A1 * | 8/2011 | Chandra et al. | 711/162 |
| 2011/0258608 | A1 * | 10/2011 | Li et al. | 717/127 |
| 2011/0276969 | A1 * | 11/2011 | Kahlon et al. | 718/102 |
| 2012/0060161 | A1 * | 3/2012 | Joung et al. | 718/102 |
| 2012/0089991 | A1 * | 4/2012 | Scheerer et al. | 719/318 |

* cited by examiner

*Primary Examiner* — Emerson Puente
*Assistant Examiner* — Mehran Kamran
(74) *Attorney, Agent, or Firm* — F. Chau & Associates, LLC; Louis J. Percello, Esq.

(57) ABSTRACT

A method for identifying a consumer-producer pattern in a multi-threaded application includes obtaining synchronization event data of the multi-threaded application, and identifying the consumer-producer communication pattern from the synchronization event data.

6 Claims, 3 Drawing Sheets

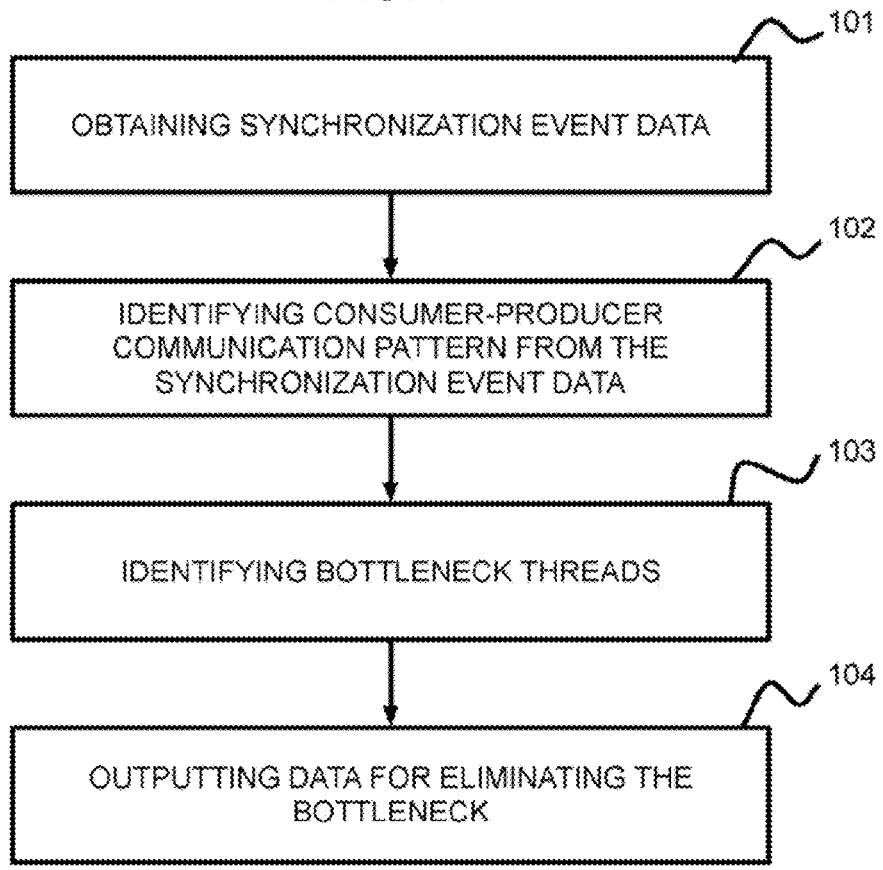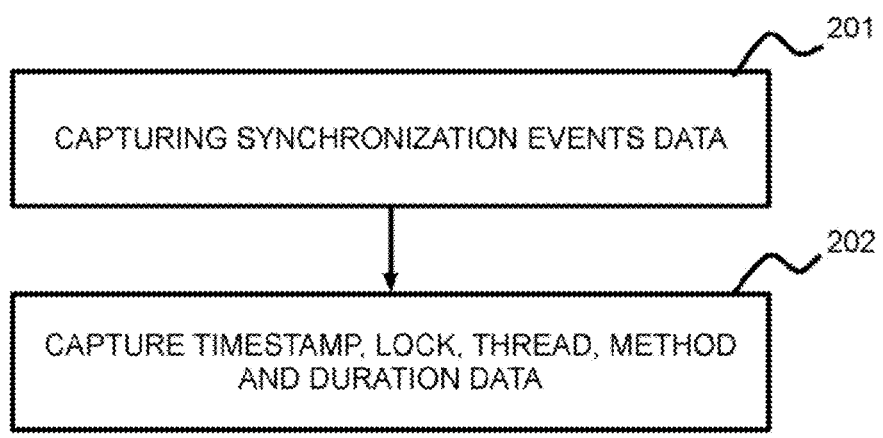

LOCATING BOTTLENECK THREADS IN MULTI-THREAD APPLICATIONS

BACKGROUND

1. Technical Field The present application relates to multi-core/multi-threading machines and more particularly to locating bottleneck threads in multi-thread applications.

2. Discussion of Related Art

Multi-core/multi-threading machines, such as those having a plurality of central processing units (CPUs) or having a CPU with a plurality of multi-threading cores, are widely used. Workloads may take advantage of thread-level parallelism afforded by the multi-core/multi-threading machines to achieve high efficiency.

Analyzing and identifying performance bottlenecks that inhibit scaling can be difficult, requiring labor intensive data generation, expert knowledge of the application, libraries, middleware, operating system and hardware, and analytical tools. After a bottleneck is identified, determining how to eliminate the bottleneck is also difficult, requiring expert knowledge of the application, libraries, middleware, operating system and hardware, and analytical tools.

Therefore, a need exists for locating bottleneck threads in multi-thread applications and determining how to eliminate the bottleneck.

BRIEF SUMMARY

According to an exemplary embodiment of the present disclosure, a method for identifying a consumer-producer pattern in a multi-threaded application includes obtaining synchronization event data of the multi-threaded application, and identifying the consumer-producer communication pattern from the synchronization event data.

According to an exemplary embodiment of the present disclosure, a method for locating a bottleneck in a multi-threaded application includes receiving synchronization event data of the multi-threaded application and an identified consumer-producer communication pattern of the synchronization event data, wherein the synchronization event data comprises at least two groups of aggregated data, each group of aggregated data corresponding to a set of threads of the multi-threaded application, and identifying a bottleneck between the sets of threads.

BRIEF DESCRIPTION OF THE SEVERAL VIEWS OF THE DRAWINGS

Preferred embodiments of the present disclosure will be described below in more detail, with reference to the accompanying drawings:

FIG. 1 is a flow chart of an exemplary method for locating a bottleneck thread in a multi-threaded application according to an embodiment of the present disclosure;

FIG. 2 is a flow chart of an exemplary method for obtaining synchronization event data according to an embodiment of the present disclosure;

DETAILED DESCRIPTION

Figure 3A:
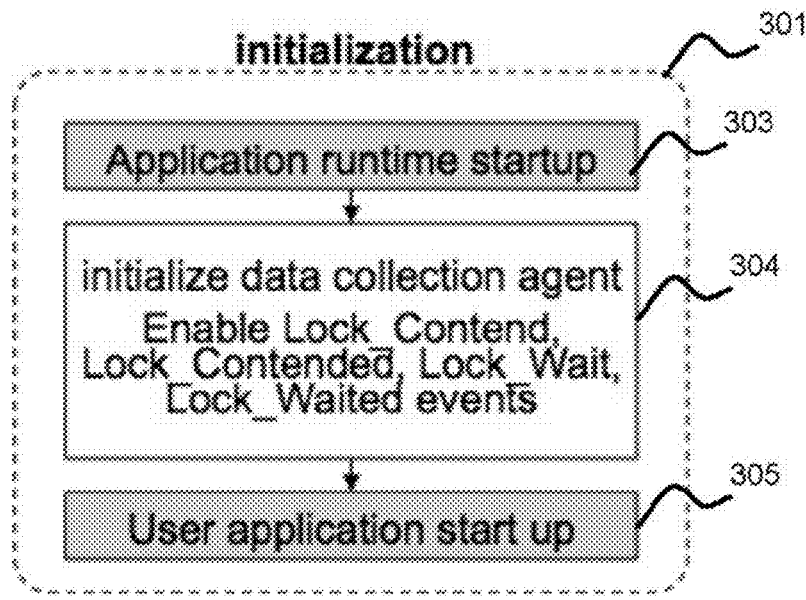
FIGS. 3A-B are flow charts of an exemplary data collection method according to an embodiment of the present disclosure.

According to an embodiment of the present disclosure, a thread is a bottleneck if it inhibits the progress of at lease one other thread. There are many reasons why a thread may be a bottleneck.

Exemplary embodiments of the present disclosure are presented in the context of bottleneck threads that participate in consumer-producer communication patterns. A consumer-producer communication pattern occurs when one or more threads are producing data that is placed in a finite buffer (e.g., a synchronized queue) and one or more other threads are consuming the data from the buffer. The buffer allows the communication to be asynchronous.

In a consumer-producer communication pattern, the producer threads are a bottleneck if they produce data at a slower rate than the consumer threads consume the data, causing the consumer threads to wait for data, which inhibits the progress of the consumer threads. The consumer threads are a bottleneck if they consuming data at a slower rate than the producer threads product the data, causing the producing threads to wait to put the data in the finite buffer, which inhibits the progress of the producer threads.

According to an exemplary embodiment of the present disclosure, a method for locating a bottleneck thread in a multi-threaded application (FIG. 1) includes obtaining synchronization event data (101), identifying consumer-producer communication pattern from the synchronization event data (102), identifying bottleneck threads (103) and providing a potential correction for eliminating the bottleneck (104). The potential correction may be provided as a message to a user or as a computer instruction for automatically eliminating the bottleneck.

According to an exemplary embodiment of the present disclosure, obtaining synchronization event data (101) (FIG. 2) comprises capturing synchronization events by a data collection component at run-time for an application (201). A synchronization event occurs when a thread attempts to obtain a shared resource. A shared resource is a resource that is shared among the threads of the application. Synchronization provides permission for the thread to obtain the shared resource. A lock is the mechanism that restricts access to a shared resource. Thus, it can be said that a thread attempts to obtain access to a lock. For each synchronization event, the data collection component records a timestamp, lock, thread, method, and duration of the synchronization event (202), e.g., the sum of the time to obtain the lock, the time to perform the computation in the critical section, and the time to release the lock.

According to the exemplary embodiment, in the context of a Java based implementation, Java Virtual Machines (JVMs) provide JVMTI agent support that can capture synchronization event data. The JVMTI events can include MONITOR_CONTEND, MONITOR_CONTENDED, MONITOR_WAIT, and MONITOR_WAITED.

Figure 3B:
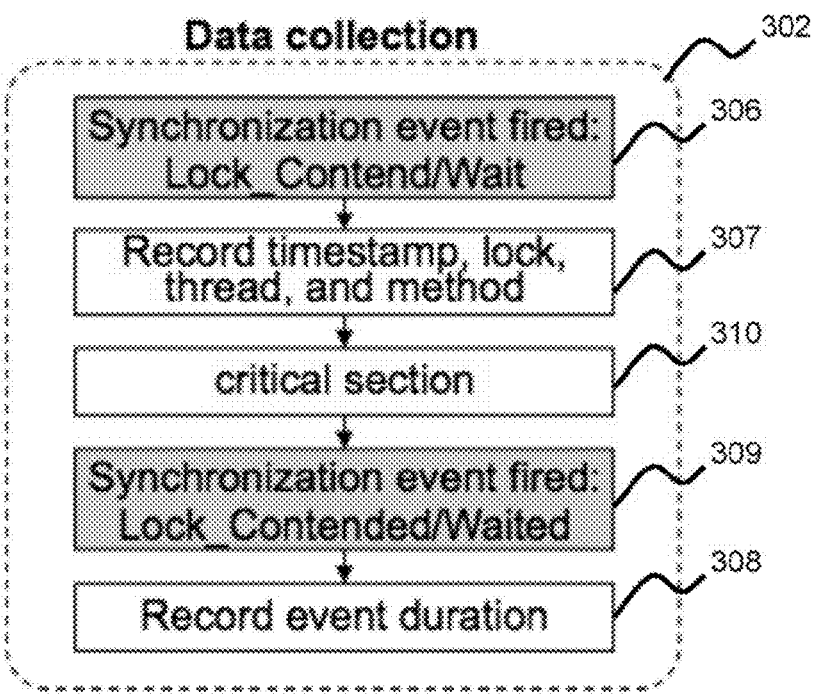

Exemplary JVMTI data collection component flows are shown in FIGS. 3A-B for initialization (301, FIG. 3A) and a data collection (302, FIG. 3B). Referring to FIG. 3A, during initialization (301) an application enters run time (303), the data collection is initialized (304) and a user session is started (305).

To identify consumer-producer communication pattern (102) and bottlenecks (103) synchronization event data is collected and analyzed.

A synchronization event is fired (306) by the data collection component upon attempting to obtain a shared resource, and the data collection component generates a sequence of raw tuples from recorded information (307, 308). A raw tuple may be recorded as a list of elements, <ts, L, T, M, D>, where is identifies the timestamp of when a synchronization event occurred, L identifies the lock, including for example, a lock on a synchronized queue involved in the synchronization, etc., T identifies the thread, M identifies the method that T calls to access L, and D identifies the duration of time waiting to access L which is a time between firing of the synchronization event at blocks 306 and 309. In FIG. 3B, the critical section is the code that is executed only when the shared resource is obtained (310).

A refined tuple, <L, M, S, C, D, Ts, Te> is determined from the raw tuples, where L identifies a lock, M identifies one or more methods used to access L, S identifies a set of threads that access L via M, C is the number of times the threads in S access L via M, D identifies the duration that the threads in S wait on L via M. Ts is a first timestamp any thread in S waits on L via M, and Te is the last time stamp any thread in S waits on L via M. The refined tuples may be determined during run time or thereafter. The refined tuples aggregate the raw tuples for a set of threads.

Referring to block 102 of FIG. 1, a consumer-producer pattern may be automatically identified as follows: given two refined tuples, <L, M1, S1, C1, D1, Ts1, Te1> and <L, M2, S2, C2, D2, Ts2, Te2>, the tuples represent a consumer-producer communication pattern if both tuples access the same lock L, M1!=M2 such that the methods that access L in each tuple are different, (S1 intersect S2)=0 such that the sets of threads in each tuple are different, C1~C2 where the number of times the threads in each tuple access L is about the same, and the tuples overlap; that is, the time interval defined by Ts1 and Te1 overlaps the time interval defined by Ts2 and Te2. In the context of C1~C2, "about" may be the number of threads, e.g., C1 and C2 may differ by the number of threads in S1.

One potential correction to a consumer-producer pattern causing a bottleneck may include increasing a size of a queue. More particularly, to eliminate a consumer-producer communication bottleneck, given that two refined tuples, <L, M1, S1, C1, D1, Ts1, Te1> and <L, M2, S2, C2, D2, Ts2, Te2>, are a consumer-producer communication pattern (102), if D1~D2 and D1>>1% of a overall execution time (103), a potential correction is determined and output (104). For example, D1 is about the same as D2, D1~D2, when an execution time of D2 differs from an execution time of D1 by less than about +/−5%, and D1 is much greater than 1%, of the execution time. Given the refined tuples above, potential corrections may include increasing the size of the synchronized queue and/or using a concurrent queue that allows multiple threads to operate on it at the same time. The identified correction(s) is output (104).

Another potential correction may include increasing a number of threads. More particularly, given that two refined tuples, <L, M1, S1, C1, D1, Ts1, Te1> and <L, M2, S2, C2, D2, Ts2, Te2>, are a consumer-producer communication pattern (102), assume without loss of generality that D1>>D2, and therefore the threads in S2 are the bottleneck (103), because the threads in S2 are inhibiting the progress of the threads in S1. For example, D1 is much greater than D2, D1>>D2, when D1 accounts for at least 5-10% of the overall execution time and D2 accounts for less than 10% of D1's execution time. If the threads in S2 do not have their progress inhibited by one or more other locks, the number of threads in S2 can be increased to facilitate the progress of the threads in S1.

If the threads in S2 do have their progress significantly inhibited by one or more locks, for each lock, the communication pattern is examined and the lock is alleviated. If the communication pattern is consumer-producer, this new consumer-producer communication pattern is used as input at block 102 of FIG. 1. If the communication pattern is not consumer-producer, other techniques may be applied.

The methodologies of embodiments of the invention may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
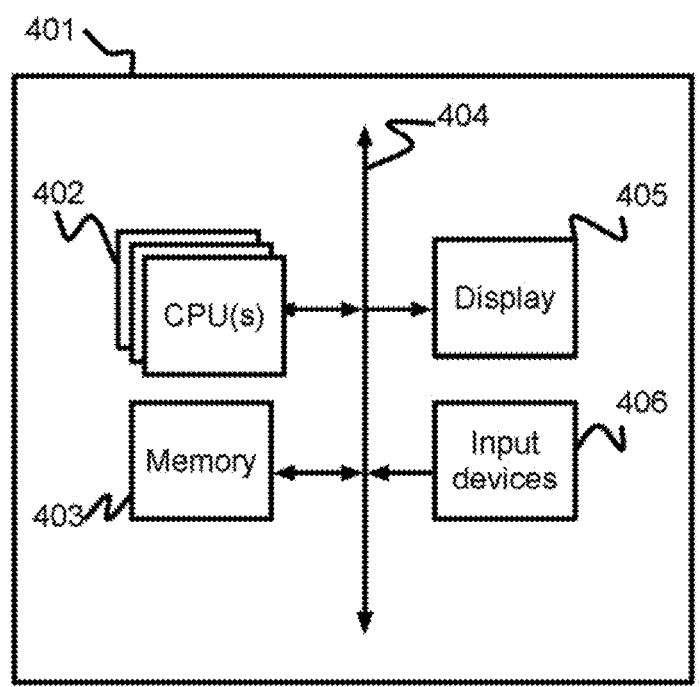
FIG. 4 is an exemplary system for locating a bottleneck thread in a multi-threaded application according to an embodiment of the present disclosure.

For example, FIG. 4 is a block diagram depicting an exemplary system for locating a bottleneck thread in a multi-threaded application. The system 401 may include a processor(s) 402, memory 403 coupled to the processor (e.g., via a bus 404 or alternative connection means), as well as input/output (I/O) circuitry 405-406 operative to interface with the processor 402. The processor 402 may be configured to perform one or more methodologies described in the present disclosure, illustrative embodiments of which are shown in the above figures and described herein.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A computer program product for locating a bottleneck in a multi-threaded application, the computer program product comprising:
 a computer readable storage medium having computer readable program code embodied therewith, the computer readable program code configured to:
 obtain synchronization event data acquired from capturing synchronization events by a data collection component at run-time, wherein a synchronization event occurs when a thread of the multi-threaded application, comprising a plurality of application threads, attempts to obtain a shared resource;
 identify a consumer-producer communication pattern from the synchronization event data, wherein the identifying of the consumer-producer communication pattern includes:
 identifying a producer thread of the plurality of application threads that produces a particular set of data from the synchronization event data, the producer thread calls a producer method to access the shared resource, and
 identifying a consumer thread of the plurality of application threads that requires as input, the particular set of data produced by the producer thread from the synchronization event data, the consumer thread calls a consumer method to access the shared resource, wherein the consumer method is not the same as the producer method;
 identify a rate at which the producer thread produces the particular set of data; and
 identify a rate at which the consumer thread consumes the particular set of data;
 determine that the consumer-producer communication pattern is a bottleneck when the identified rate at which the consumer thread consumes the particular set of data exceeds the identified rate at which the producer thread produces the particular data; and
 eliminate the bottleneck by increasing a size of a synchronized queue shared by threads of the multi-threaded application and changing an implementation of a data structure used by consumers and producers to communicate.

2. The computer program product of claim 1, wherein the computer readable program code configured to obtain the synchronization event data further comprises:
 computer readable program code configured to capture the synchronization event data at run-time of the multi-threaded application, the synchronization event data comprising a timestamp, lock, thread, method, and duration of synchronization event for each of a plurality of synchronization events.

3. The computer program product of claim 1, wherein the computer readable program code configured to identify the consumer-producer communication pattern from the synchronization event data further comprises:
 computer readable program code configured to aggregate the synchronization event data into groups corresponding to different threads accessing or requesting access to a lock;
 computer readable program code configured to compare the groups of aggregated synchronization event data; and
 computer readable program code configured to identify the consumer-producer communication pattern upon determining that the groups of the aggregated synchronization event data include threads attempting to access the lock, use different methods for the attempted accesses, a set of threads is different for the groups of the aggregated synchronization event data, a number of times the set of threads associated with each of the groups of the aggregated synchronization event data access the lock is the same, and a time interval of the groups of the aggregated synchronization event data overlaps.

4. The computer program product of claim 1, wherein the computer readable program code configured to determine that the consumer-producer communication pattern is a bottleneck further comprises:
    computer readable program code configured to determine a duration of time waiting to access a lock; and
    computer readable program code configured to determine that a first thread of the multi-threaded application is inhibiting a second thread of the multi-threaded application.

5. The computer program product of claim 1, wherein the computer readable program code configured to eliminate the bottleneck further comprises: computer readable program code configured to increase a number of threads of the multi-threaded application for accessing a lock.

6. The computer program product of claim 3, wherein the computer readable program code configured to determine that the consumer-producer communication pattern is a bottleneck further comprises: computer readable program code configured to determine a duration of time for a group of aggregated synchronization event data to access a lock; and the duration of time for a first group of the groups of aggregated synchronization event data to access the lock is greater than the duration of time for a second group of the groups of aggregated synchronization event data to access the same lock with a different set of threads using different methods.

* * * * *